United States Patent [19]

Novotny et al.

[11] Patent Number: 5,000,933

[45] Date of Patent: Mar. 19, 1991

[54] PROCESS FOR HYDROTHERMAL PRODUCTION OF SODIUM SILICATE SOLUTIONS

[75] Inventors: Rudolf Novotny, Duesseldorf; Alfred Hoff, Moers-Schwafheim; Jost Schuertz, Solingen, all of Fed. Rep. of Germany

[73] Assignee: Henkel Kommanditgesellschaft auf Aktien, Duesseldorf, Fed. Rep. of Germany

[21] Appl. No.: 472,980

[22] Filed: Jan. 31, 1990

[30] Foreign Application Priority Data

Jan. 31, 1989 [DE] Fed. Rep. of Germany ....... 3902751
Jan. 31, 1989 [DE] Fed. Rep. of Germany ....... 3902754

[51] Int. Cl.$^5$ ............................................. C01B 33/32
[52] U.S. Cl. .................... 423/334; 423/332; 423/333
[58] Field of Search .................... 423/334, 332, 333

[56] References Cited

U.S. PATENT DOCUMENTS

| | | | |
|---|---|---|---|
| 3,984,526 | 10/1976 | Haase et al. | 423/332 |
| 4,029,736 | 6/1977 | Melkonian | 423/118 |
| 4,520,001 | 5/1985 | Metzger et al. | 423/332 |
| 4,770,866 | 9/1988 | Christophliemk et al. | 423/334 |

FOREIGN PATENT DOCUMENTS

| | | |
|---|---|---|
| 649739 | 12/1964 | Belgium . |
| 0164073 | 12/1985 | European Pat. Off. . |
| 609831 | 5/1979 | Fed. Rep. of Germany . |
| 002857 | 7/1981 | Fed. Rep. of Germany . |
| 313814 | 10/1983 | Fed. Rep. of Germany . |
| 3515233 | 10/1986 | Fed. Rep. of Germany ...... 423/334 |
| 2525204 | 10/1983 | France . |
| 2541667 | 8/1984 | France . |
| 4529580 | 9/1970 | Japan ................................... 423/332 |
| 0111227 | 7/1982 | Japan ................................... 423/334 |
| 518772 | 7/1978 | United Kingdom . |
| 2078701 | 1/1982 | United Kingdom ................. 423/334 |

OTHER PUBLICATIONS

Hackh's Chemical Dictionary, Fourth Edition, Grant pp. 183 and 596.
Patent Abstracts of Japan "Production of Alkali Silicate", 57-111232.
Advanced Inorganic Chemistry, 5th Ed., pp. 278-279 (Cotton).
Encyclopedia of Chemical Technology, 3rd Ed., pp. 755-761 (Kirk-Othmer).

Primary Examiner—Gary P. Straub
Assistant Examiner—Lori F. Cuomo
Attorney, Agent, or Firm—Ernest G. Szoke; Wayne C. Jaeschke; Norvell E. Wisdom, Jr.

[57] ABSTRACT

The direct hydrothermal production of high purity sodium silicate solutions having a high $SiO_2$: $Na_2O$ molar ratio by reaction of a silicon dioxide source with aqueous sodium hydroxide solutions, or with aqueous sodium silicate solutions having a lower $SiO_2$: $Na_2O$ molar ratio, is made possible by using a silicon dioxide source that contains a sufficient fraction of cristobalite phase, or by conditioning other crystalline forms of silicon dioxide by heating at or above 1100° C., but below the melting point of silica, before the hydrothermal treatment. Preferably the sodium hydroxide solution has a concentration range of 10 to 50% by weight, and the reaction is carried out in a closed pressure reactor at temperatures of 150° to 300° C. and under saturated steam pressures corresponding to those temperatures.

24 Claims, 1 Drawing Sheet

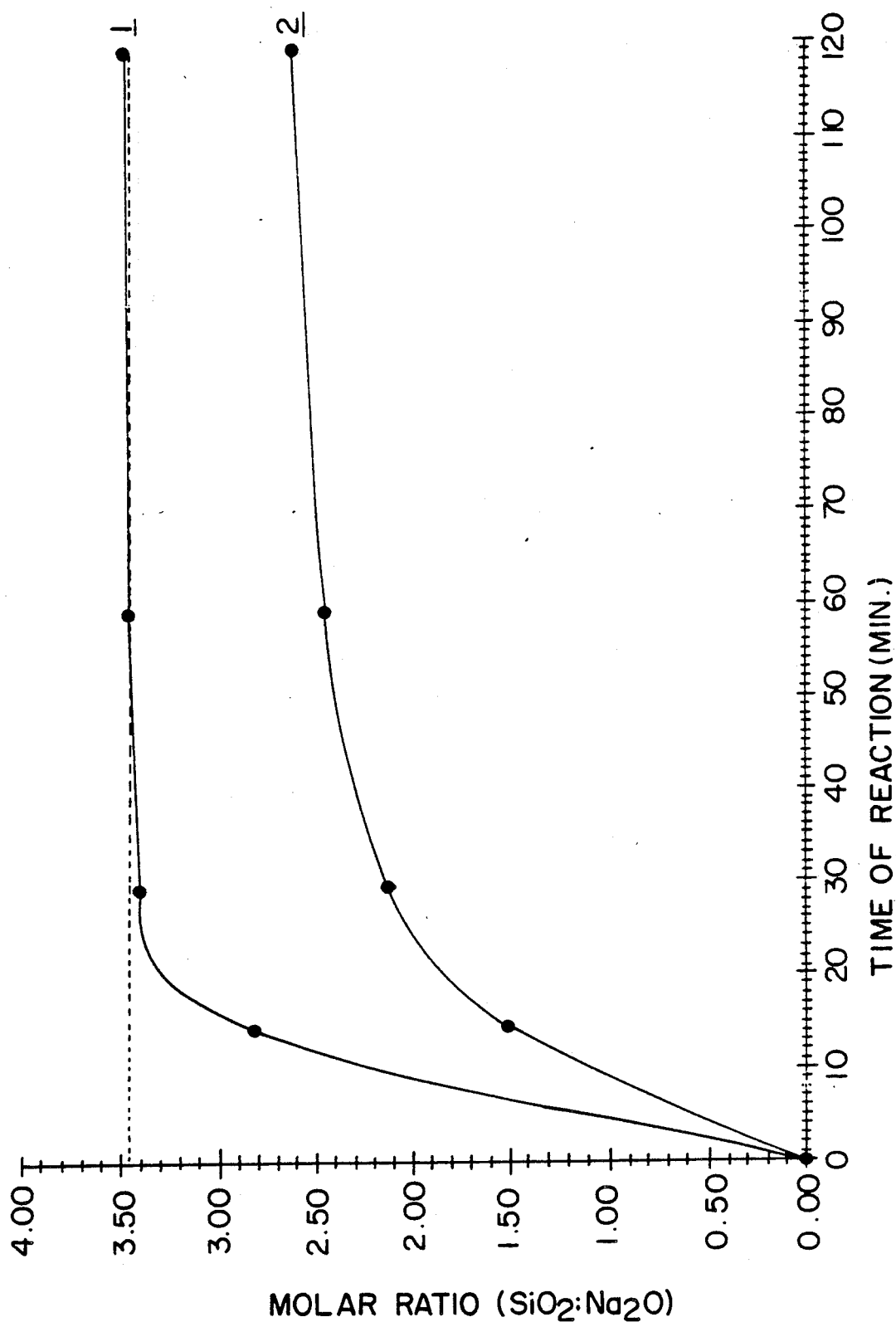

PROCESS FOR HYDROTHERMAL PRODUCTION OF SODIUM SILICATE SOLUTIONS cFIELD OF THE INVENTION

The present invention relates to a process for the hydrothermal production of sodium silicate solutions having a high $SiO_2:Na_2O$ molar ratio.

STATEMENT OF RELATED ART

A general synopsis of the production of aqueous sodium silicate solutions can be found in the works of Winnacker & Küchler, *Chemische Technologie.* Vol. 3, *Anorganische Technologie II*, 4th Edition, 1983, pages 54–63 and in *Ullmanns Encyklopadie der technischen Chemie*, Vol. 21, 4th Edition, 1982, pages 409–412. The term "sodium silicate" does not designate any particular compound with fixed atomic proportions, and in practice sodium silicates are usually characterized chemically in terms of their stoichiometric equivalent ratios of silicon dioxide (also interchangeably called silica herein for brevity) to sodium oxide.

Of the alkali metal silicates known as "waterglass", sodium silicate solutions (also known as soda waterglass) are the most widely used for industrial purposes. Soda waterglasses predominantly have a solids content of from about 30 to 40% by weight and a molar ratio of silicon dioxide sodium oxide of 3.4 to 3.5:1. The industrial manufacture of soda waterglasses is generally based on the fusion of quartz sand and soda in suitable furnaces at temperatures in the range from 1400° to 1500° C. The melt which solidifies on cooling ("solid glass") is dissolved in water under pressure at elevated temperature in another process step and the solution obtained is optionally filtered, depending on the quality requirements.

However, this high-temperature fusion process is very expensive both in terms of apparatus and in terms of energy consumption and, in addition, it can produce considerable air pollution by emissions such as dust, nitrogen oxides, and sulfur oxides.

In addition to this high-temperature fusion process, which is the most widely used on an industrial scale, there are hydrothermal processes for the production of aqueous sodium silicate solutions which are described in a number of patent applications. These processes, if they produce sodium silicate solutions with a high a high $SiO_2:Na_2O$ molar ratio, utilize amorphous silicon dioxide, such as that from industrial flue dusts and from naturally occurring amorphous silicon dioxide containing minerals, as the source of silica for their products.

DE-AS 28 26 432 relates to a process for the production of waterglass solutions by reaction of the flue dusts obtained in the production of silicon or ferrosilicon alloys with aqueous alkali metal hydroxide solutions at elevated temperature and subsequent filtration of the solutions obtained. In this process, the flue dust is treated with a 6 to 15% by weight aqueous alkali metal hydroxide solution in an autoclave at temperatures in the range from 120° C. to 190° C. under a pressure of 2.9 to 18.6 bar, the ratio by weight of alkali metal hydroxide solution to solid flue dust being from 2:1 to 5:1. The products of this process have a molar ratio of $SiO_2$ to $Na_2O$ of 2.2 to 4:1. The flue dusts used as starting materials have a silicon content of 89 to 98% by weight (in the examples in this reference, the silicon content of the flue dust is always 90% by weight), the remainder consisting of impurities.

DE-OS 26 09 831 teaches a process for working up siliceous, environment-polluting waste flue dusts from the manufacture of silicon metal and silicon alloys into silicas or silicates, wherein the following process steps I to III are jointly used:

I dissolving the flue dusts in alkali hydroxide solutions to form alkali silicate solutions;

II purifying the alkali silicate solutions to remove organic constituents by treatment with active carbon and/or oxidizing agents and removing the non-digestible residue from the solution;

III reacting the alkali silicate solutions with inorganic or organic acids and/or salts thereof for further purification.

The alkali silicate solutions obtained in this way generally have a molar ratio of $SiO_2$ to $Na_2O$ in the range from 3.3 to 5.0:1.

DE-OS 26 19 604 teaches a process for the production of liquid waterglass from amorphous silicon dioxide and alkali hydroxide, characterized in that siliceous particles in the form of flue dust that has been removed from the waste gases of ferroalloy industries and other industries using silicon furnaces, alkali hydroxide, and water are mixed in a certain ratio by weight and the resulting mixture is heated with stirring to a temperature in the range from 75° to 100° C., after which the liquid obtained is cooled. The siliceous dusts used as starting material for this waterglass production process generally have a silicon dioxide content of 94 to 98% by weight, the balance consisting of impurities.

DE-AS 23 28 542 teaches a process for the production of alkali metal silicates by treatment of perlite with an alkali hydroxide and hydrothermal treatment of the pulp obtained in an autoclave, followed by filtration. In this process, alkali solution having a of 40 to 140 g/l $Na_2O$ is used to treat the perlite in a quantity at which the ratio of liquid phase to solid phase is 0.7 to 1.5:1. The perlite is a substantially amorphous glass-like mountain rock of volcanic origin which consists mainly of (in % by weight) silicon dioxide 73, aluminum oxide 15 and other oxides 8.

The end products of these known processes for hydrothermal reaction of amorphous silica sources are of poor quality as a result of the impurities typically present in the flue dusts and the naturally occurring amorphous silicon dioxide compounds used as starting materials and, accordingly, are of only limited use for industrial products, unless subjected to further purification.

The related art described hereinafter relates to processes for the hydrothermal production of sodium silicate solutions from crystalline form of silicon dioxide, such as sand, and sodium hydroxide. Such state-of-the-art processes can produce only an $SiO_2:Na_2O$ molar ratio of less than 2.89:1 by weight in their end products.

DE-OS 30 02 857 teaches a process for the hydrothermal production of sodium silicate solutions having a molar ratio of $SiO_2$ to $Na_2O$ of 1.03 to 2.88:1 by reaction of sand with aqueous sodium hydroxide solution under pressure and at elevated temperature, followed by filtration, characterized in that the aqueous sodium hydroxide solution having a concentration of 10 to 50% by weight is reacted with an excess of sand of up to 300%, based on the molar ratios of $SiO_2:Na_2O$ in the batch, at temperatures in the range from 150° to 250° C. and under saturated steam pressures corresponding to those temperatures, and in that the unreacted sand excess is completely or partly used as a filter medium for the sodium silicate solution formed. According to the Examples of this reference, however, the maximum $SiO_2$:$Na_2O$ molar ratio achieved in the water glasses resulting from the process is 1.68:1.

DE-34 21 158 teaches a process the hydrothermal production of sodium silicate solutions having a molar ratio of $SiO_2$:$Na_2O$ of 1.96 to 2.17:1 by reaction of excess sand with aqueous sodium hydroxide solution, characterized in that the reaction mixture containing an excess of sand and an aqueous sodium hydroxide solution heated by process heat is reacted in a rotating, cylindrical, closed pressure reactor to a certain molar ratio of $SiO_2$:$Na_2O$ and is then filtered using the excess sand and, optionally, an additional filter aid. Aqueous sodium silicate solutions having a molar ratio of $SiO_2$ to $Na_2O$ of up to 2.27:1 are mentioned in the Examples.

DE-OS 33 13 814 teaches a process for the production of a clear solution of a sodium silicate, in which the molar ratio of silicon dioxide to sodium oxide is at most 2.58:1, by digestion of crystalline silicon dioxide having an average grain size of from 0.1 to 2 millimeters ("mm"), characterized in that an aqueous solution of sodium hydroxide is passed through a bed of silicon dioxide which is formed in a vertical tubular reactor with no mechanical agitation and which is fed downwards with silicon dioxide and an aqueous solution of the sodium hydroxide.

Belgian patent 649 739 describes a process and an apparatus for the production of clear sodium silicate solutions by dissolving a silica-containing material under pressure at elevated temperature in aqueous caustic soda, characterized in that the product is separated from the excess silica-containing material and/or from the insoluble contaminated substances by means of filtration elements arranged near the bottom of the reactor, the filtration process advantageously being carried out under temperature and pressure conditions very similar to the reaction conditions. The aqueous sodium silicate solutions obtained in this way have a molar ratio of $SiO_2$ to $Na_2O$ of approximately 2.5:1.

Hydrothermal processes of the type in question for the production of soda waterglasses from sand and sodium hydroxide are also discussed in the above-cited works of Winnacker and Küchler and of Ullmann. However, it is stated in Winnacker and Küchler (on pages 61 and 62) that it is only possible to obtain a soda waterglass with an $SiO_2$:$Na_2O$ ratio of less than 2.7 at the temperatures typically applied in the hydrothermal process. Ullmann mentions in this regard that it is only possible in this way to obtain sodium silicate solutions having molar ratios of $SiO_2$:$Na_2O$ of up to 2.5:1 (page 412, left-hand column).

Accordingly, on the basis of the literature cited above, there is a direct teaching against the feasibility of production of sodium silicate solutions having relatively high $SiO_2$:$Na_2O$ molar ratios from sand or other crystalline $SiO_2$ and sodium hydroxide by a hydrothermal process.

By contrast, a major object of the present invention is to provide a process for the hydrothermal production of sodium silicate solutions by reaction of a crystalline silicon dioxide with aqueous sodium hydroxide solution, in which sodium silicate solutions having molar $SiO_2$:$Na_2O$ ratios of at least 2.9:1 are obtained.

BRIEF DESCRIPTION OF THE DRAWINGS

The figure is a graphical representation of the variation of the $SiO_2$:$Na_2O$ ratio with time of reaction.

DESCRIPTION OF THE INVENTION AND DRAWING

In this description, except in the working examples and where expressly stated to the contrary, all numbers representing amounts of materials or conditions of reaction or use are to be understood as modified by the term "about".

The object of the invention is achieved by the reaction of a particular type of solid silica source, specifically one that has been obtained by heating a predominantly crystalline silica source, especially quartz and/or quartz sand, at a temperature of at least 1100. C prior to hydrothermal reaction and/or consists predominantly of silica in its cristobalite crystal form. The term "predominantly" is to be understood as describing a material that contains more than 50% by volume of the stated predominant material. The solid silica source of the type described above is reacted hydrothermally with a solution that consists essentially of water, dissolved sodium hydroxide (which is, of course, chemically equivalent to "dissolved" sodium oxide), and, optionally, dissolved sodium silicate; the molar ratio of $SiO_2$:$Na_2O$ in the initial aqueous solution used for the hydrothermal reaction is less than the value desired for this ratio in the final product waterglass solution. The reaction solution may initially contain no silicate at all, so that the stated ratio would be zero.

It should be noted that the two alternative descriptions of the silica source for hydrothermal reaction according to the invention are by no means mutually exclusive. Indeed, while the applicants do not wish to be bound by theory, it is believed that the primary function of the heating of other types of crystalline silica to be used in a process according to the invention is to convert these other crystal forms to cristobalite. It should also be noted that both alpha and beta forms of cristobalite are included within the term as used herein.

In general, the higher the content of cristobalite in a silica source identified as containing that material, the more readily it will work in the invention. For economic reasons, however, a silica source obtained by heating sand, or some other cheap natural source of crystalline silica, is often preferred for the invention because it is cheaper than natural or synthetic cristobalite. Among the natural sources of silica for this embodiment of the invention, quartz, usually quartz sand, is preferred.

The time of heating crystalline siliceous materials to make them suitable for the invention is not critical. Generally, in order to assure an effective result and allow time for the temperature to rise in all parts of a batch of solid siliceous material to be treated, it is strongly preferred that the material be exposed to heat for at least ten minutes. Heating can be continued as long as desired, but generally for economic reasons the heating time should not be excessive. A time from 10 minutes to 8 hours is preferred, with thirty minutes to one hour generally more preferred.

Irrespective of the source of the silica used in the final hydrothermal reaction step and of whether or not the aqueous solution used in this step also contains dissolved silicate, the aqueous sodium hydroxide used in this part of the process preferably has a concentration range of 10 to 50%, more preferably 15 to 30% by weight, still more preferably 20-30% by weight, of sodium hydroxide or its stoichiometric equivalent of $Na_2O$. Also, irrespective of other factors, the hydrothermal reaction occurs in a pressure reactor, preferably at a temperature of 150° to 300°, more preferably at a temperature of 200° to 250° C., under saturated steam pressure corresponding to the temperature used.

The process according to the invention is easier to handle on an industrial scale and, hence, is less expensive than the heavily polluting state of the art processes with their high energy consumption, i.e. the high-temperature fusion processes involving a subsequent dissolving step.

The process according to the invention has the advantage over known hydrothermal processes that, through the use of the silica specially selected in accordance with the invention, it is possible to obtain sodium silicate solutions with a molar ratio of $SiO_2$ to $Na_2O$ of more than 2.9:1, which is not possible where unconditioned quartz is used as the $SiO_2$ component.

It has also surprisingly been found that aqueous sodium silicate solutions which have a molar ratio of $SiO_2$ to $Na_2O$ of more than 2.9:1 can be directly produced in a single step from silica selected in this way, preferably from cristobalite formed in this way, by hydrothermal synthesis under the conditions described above, with high conversion of the reaction components used, even with short reaction times. The use of a readily soluble crystalline silicon dioxide modification enables sodium silicate solutions having a high molar ratio of silicon dioxide to sodium oxide to be obtained in high volume per unit time yields with minimal energy consumption.

The sodium silicate solutions obtained by any process according to this invention preferably have an $SiO_2$:$Na_2O$ molar ratio of no more than 3.7:1, more preferably of 3.0 to 3.6:1, and most preferably of 3.3 to 3.5:1.

In one preferred embodiment of the invention, the aqueous sodium silicate solution is obtained by using as the selected silicon dioxide a quartz which has been heat-treated at temperatures of 1200° to 1700° C. in the presence of catalytic quantities of alkali, changing largely into cristobalite under those conditions, and by reacting the quartz thus heat-treated with aqueous sodium hydroxide solution in a concentration range of 15 to 30% by weight, more preferably 20 to 30% by weight, the reaction being carried out in a closed pressure reactor at a temperature in the range from 200° to 250° C. and under the saturated steam pressures corresponding to the temperature.

Cristobalite, like quartz, is a crystal modification of silicon dioxide. It is produced almost entirely synthetically by calcination of quartz in a process in which quartz sand is continuously converted at temperatures of approximately 1500° C. in the presence of catalysts (alkali compounds). Extensive information on cristobalite can be found in *Ullmanns Encyklopadie der technischen Chemie*, Vol. 21, 4th Edition, 1982, pages 439–442.

In the context of the invention, therefore, it is particularly preferred to use as the selected silicon dioxide a quartz which has been treated at temperatures in the range from 1300° C. to 1600° C. in the presence of catalytic quantities of alkali, changing largely into cristobalite under those conditions. In addition, it is of particular advantage to use a freshly heat-treated, still warm cristobalite material for the process according to the invention.

In another preferred embodiment of the process according to the invention, the hydrothermal reaction is carried out by using in the reactor an excess of selected silica of up to 100%, preferably from 1 to 10%, over the amount required stoichiometrically, together with the amount of sodium hydroxide in the solution at the beginning of hydrothermal reaction, to produce the desired molar ratio of $SiO_2$ to $Na_2O$ in the product sodium silicate solution. In general, the reaction may even be carried out with larger excesses than 100% of selected silica, although this is not generally advantageous on an industrial scale. It is particularly preferred to carry out the reaction with an excess of 2 to 5% of selected silica, based on the desired $SiO_2$:$Na_2O$ molar ratio, when the aqueous solution used in the final hydrothermal step of the process initially contains no significant amount of dissolved silicate.

A particular advantage of an embodiment of a process according to the invention in which the aqueous solution used for the final hydrothermal reaction step does contain some dissolved silicate initially is that sodium silicate solutions having high silicon dioxide: sodium oxide molar ratios are obtained simply and very economically on an industrial scale, because a less expensive silica source, usually sand, may initially be used to carry out a preliminary reaction, i.e. the reaction of quartz sand and aqueous sodium hydroxide solution, the more expensive crystalline silicon dioxide component that is high in cristobalite and/or obtained by heating of quartz being used only for a subsequent "silication" reaction. In this way, sodium silicate solutions having an $SiO_2$:$Na_2O$ molar ratio of 2.9 to 3.6:1, depending on the composition of the heated quartz, can be produced from a sodium silicate solution with a molar ratio of $SiO_2$ to $Na_2O$ of less than 2.9:1 with addition of the heated quartz as the crystalline silicon dioxide component for the final reaction step.

The sodium silicate solutions initially obtained as intermediate product in the hydrothermal reaction of quartz usually sand, with sodium hydroxide solutions may be a known manner by any appropriate conventional process. To produce solutions for use in the invention, it is preferred to react quartz sand with aqueous sodium hydroxide solution in a concentration range of 10 to 50% by weight and more especially 15 to 30% by weight in a pressure reactor, the reaction being carried out at temperatures in the range from 150° to 300° C. and more preferably in the range from 200° to 250° C. under saturated steam pressures corresponding to those temperatures.

The sodium silicate solutions obtained in this way have $SiO_2$:$Na_2O$ molar ratios of less than 2.9:1 and solids concentrations of generally from 20 to 55%. For use in the invention, sodium silicate solutions having solids concentrations in the range from 25 to 40% and more especially from 30 to 38% are preferred as the intermediate product.

In one preferred embodiment of the invention, the sodium silicate solutions obtained as intermediate product as described above are subsequently reacted under the hydrothermal synthesis conditions described above with a quartz which has been heated at temperatures in the range from 1200° to 1700° C. in the presence of catalytic quantities of alkali and converted largely into cristobalite under those conditions.

In another preferred embodiment of the present invention, the hydrothermal production of the sodium silicate solutions having a high $SiO_2$:$Na_2O$ molar ratio required as end product is carried out as follows:

Quartz sand and aqueous sodium hydroxide solution (caustic soda) are first reacted at a certain temperature and pressure level in the pressure reactor. The heat-treated quartz that is to be added to the sodium silicate solution formed as intermediate product is brought to the same temperature and pressure level and then combined in the pressure reactor with the sodium silicate solution present therein. The hydrothermal synthesis is then continued under the same temperature and pressure conditions until the desired molar ratio of $SiO_2$:$Na_2O$ of from 2.9 to 3.6:1 is reached in the end product.

On the other hand, the pressure vessel may first be vented on completion of the first process step and left to cool to a practicable working temperature, the optionally preheated selected silica source being subsequently introduced into the pressure vessel and the hydrothermal synthesis completed after the desired temperature and pressure conditions have been re-established. By comparison with this alternative procedure, the preferred embodiment of the process described above, which may be regarded as virtually a single-step process in regard to the constant temperature and pressure conditions prevailing during the hydrothermal synthesis, affords particular economic advantages in terms of high volume per unit time yields for minimal energy consumption.

In general, any of the reactors conventionally used for the hydrothermal synthesis of soda waterglass may also be used to carry out the process according to the invention. Reactors such as these include, for example, rotating dissolvers, stationary dissolver arrangements, stirrer-equipped reactors, jet loop reactors, tube reactors and, in principle, any reactors which are suitable for reacting solids with liquids under pressure. Reactors such as these are described in detail, for example, in DE-OS 30 02 857, DE-OS 34 21 158, DE-AS 28 26 432, BE-PS 649 739, DE-OS 33 13 814 and DE-PS 968 034.

The "one-step" variant of the process described above requires a suitable separate pressure vessel in which the selected silica source to be added to the sodium silicate solution formed as an intermediate product can be brought to the desired temperature and pressure level. This separate pressure vessel is either directly connected to the actual reactor by corresponding pipes provided with shutoff valves or, for example in the case of rotating reactors, is connected to the actual reactor as required by suitable pipes. The equipment and fittings required for this purpose are also known to those skilled in the art.

The sodium silicate solutions (soda waterglass solutions) produced in accordance with the invention may be used for all the usual applications which are known to those skilled in the art and which are described in the relevant literature, for example for the production of fillers (precipitated silicas), as adhesives, as binders in paints, as foundry aids, as catalyst supports, as a component of detergents, and as a constituent of refractory materials.

The invention is illustrated, but not limited, by the following working examples.

EXAMPLES

Examples were carried out both on a laboratory scale and on an industrial scale. A commercially available synthetic cristobalite, obtained by heating naturally occurring quartz sand at 1300° to 1600° C. in the presence of alkali as catalyst was used as the selected silica in the Examples, except where otherwise noted. This crystalline $SiO_2$ contained >99.0% by weight $SiO_2$.

Group I: Examples Without Dissolved Silicate in the Initial Aqueous Solution Used for the Final Hydrothermal Reaction Stage of the Process A cylindrical autoclave externally heated to the reaction temperature by a heat-transfer medium was used for the laboratory tests. Details of the starting material reacted, the reaction conditions, and characteristics of the reaction products are given in Tables 1 and 2 below.

A horizontally arranged, nickel-clad cylindrical steel pressure vessel with a volume when empty of approximately 24 cubic meters ("$m^3$") was used as the reactor for the industrial-scale tests. The pressure vessel rotated about a horizontal shaft at a speed of 6 revolutions per minute ("r.p.m."). It was heated with steam at 20 or 25 bars pressure through an opening in the shaft and an attached

TABLE 1

| | AMOUNTS OF STARTING MATERIALS FOR EXAMPLES 1-6 | | | |
|---|---|---|---|---|
| | Starting Material Quantities | | | |
| Example Number | Cristobalite, grams | Sodium hydroxide Solution, grams | Weight % NaOH in the Solution | Molar ratio in reaction[1], $SiO_2$:$Na_2O$ |
| 1 | 49 | 94.02 | 20.0 | 3.46:1 |
| 2 | 49 | 62.68 | 30.0 | 3.46:1 |
| 3[2] | 49 | 91.28 | 20.0 | 3.56:1 |
| 4[3] | 49 | 89.54 | 20.0 | 3.63:1 |
| 5[3] | 49 | 89.54 | 20.0 | 3.63:1 |
| 6[3] | 49 | 89.54 | 20.0 | 3.63:1 |

[1]Taking into account all the $SiO_2$ and $Na_2O$ components present in the reactor
[2]Cristobalite excess 3.0%, based on a desired molar ratio of $SiO_2$ to $Na_2O$ in the solution of 3.46:1
[3]Cristobalite excess 5.0%, based on a desired molar ratio of $SiO_2$ to $Na_2O$ in the solution of 3.46:1

TABLE 2

| | REACTION CONDITIONS AND PRODUCT CHARACTERIZATION FOR EXAMPLES 1-6 | | | | |
|---|---|---|---|---|---|
| | | | Sodium Silicate Solution[2] | | |
| Example Number | HT[1] Reaction Conditions | | | | Molar ratio, $SiO_2$:$Na_2O$ |
| | Time, min | Temperature, °C. | % $SiO_2$ | % $Na_2O$ | |
| 1 | 30 | 215 | 33.22 | 10.31 | 3.32:1 |
| 2 | 30 | 215 | 43.07 | 13.17 | 3.37:1 |
| 3 | 30 | 215 | 33.66 | 10.24 | 3.39:1 |
| 4 | 30 | 215 | 33.78 | 10.22 | 3.41:1 |
| 5 | 60 | 215 | 34.14 | 10.17 | 3.46:1 |

TABLE 2-continued
REACTION CONDITIONS AND PRODUCT CHARACTERIZATION FOR EXAMPLES 1-6

| Example Number | HT[1] Reaction Conditions | | Sodium Silicate Solution[2] | | |
|---|---|---|---|---|---|
| | Time, min | Temperature, °C. | % SiO$_2$ | % Na$_2$O | Molar ratio, SiO$_2$:Na$_2$O |
| 6 | 120 | 215 | 37.27 | 10.15 | 3.48:1 |

[1]HT stands for "hydrothermal"
[2]The liquid phase in the reactor at the end of reaction. Filtration is preceded by dilution to a solids content of <41% in the sodium silicate solution tube that provided effective distribution directly into the reaction vessel.

The aqueous sodium hydroxide solution (caustic soda) required for the process was heated to around 103 C with vapors from the preceding batch through a Venturi nozzle placed above the caustic soda storage vessel.

The quantities of cristobalite and caustic soda were determined by weighing machines. The starting materials were introduced into the reactor which was then closed and set rotating. The reaction mixture was heated to the reaction temperature of approximately 215°C. by the direct introduction of steam and was kept at that temperature. After a reaction time of 30 minutes ("min") at that temperature, the rotation of the reactor was brought to a stop and the reaction mixture was transferred under its own pressure into an exhaust receiver through a flanged-on pipe. The reaction mixture was then separated via a cyclone separator into vapors and waterglass solution having a temperature of approximately 105° C. The vapors were taken in by a jet apparatus and were used to preheat the mixed sodium hydroxide of the next batch in a Venturi nozzle to the limit of the boiling temperature of the sodium hydroxide solution of approximately 103° C.

The further processing of the waterglass solution with a temperature of approximately 100° C. was carried out either in a sedimentation vessel, for the separation of coarse solids or, where the clarity of the solution has to meet more stringent requirements, with a filter.

The conditions of Example 4 were selected as reaction conditions for the industrial-scale tests. The batch size was 24,000 kilograms ("kg"). The approximately 41% soda waterglass solution obtained had an SiO$_2$:Na$_2$O molar ratio of 3.4:1 and substantially corresponded to the result of the laboratory-scale test.

In one particular embodiment, the hydrothermal process using cristobalite/NaOH solution can take place at relatively high solids concentrations in the reactor because, even with a high SiO$_2$:Na$_2$O molar ratio, the sodium silicate solution has an adequate viscosity range for the process under the reaction conditions of 215° C. and 20 bar. On completion of the reaction, water may be additionally introduced, either under pressure directly into the reactor, or into the exhaust line to a receiving vessel during the process of removal from the reactor vessel, so that the sodium silicate solution which has entered the receiving vessel through the exhaust line is diluted sufficiently, before further processing by sedimentation or filtration, to have a sufficiently low viscosity for effective sedimentation or filtration at temperatures of approximately 100° C.

The experimental conditions particularly studied in Examples 1-6 are discussed briefly below.

EXAMPLE 1

Example 1 illustrates favorable conditions in terms of the relatively low sodium hydroxide solution concentration used. The cristobalite was used in a stoichiometric quantity, based on a selected SiO$_2$:Na$_2$O molar ratio of 3.46:1 to be obtained in the product sodium silicate solution.

EXAMPLE 2

An increased NaOH concentration was used in relation to Example 1, for a comparable reaction time, to determine the effect of the NaOH concentration on the reaction velocity and the obtainable SiO$_2$:Na$_2$O ratio.

EXAMPLE 3 and 4

To obtain a relatively high molar ratio of SiO$_2$ to Na$_2$O in the reaction solution, cristobalite was used in an increasing excess (+3% and +5% respectively) in relation to Example 1, based on the desired SiO$_2$ to Na$_2$O ratio of 3.46:1 for the product solution.

EXAMPLES 5 and 6

With a cristobalite excess of 5%, based on the desired ratio of SiO$_2$ to Na$_2$O of 3.46:1 for the product solution, the reaction times were lengthened compared with Example 4.

EXAMPLE 7

In this group of examples, the synthetic cristobalite used in Examples 1-6 was compared with quartz sand heated at various temperatures before hydrothermal reaction, in order to demonstrate the effect which the quartz conditioning temperature has on the properties of the aqueous sodium silicate solutions produced. Samples of the same type of quartz sand were first heat-treated at temperatures of 850° C. to 1600° C. in the presence or absence of catalytic quantities of alkali, as shown in Table 3, and then hydrothermally reacted with sodium hydroxide solution. To make sure that the heat-treating had reached a stable value, the heat treatment for these examples was for a period of four hours. For comparison, unheated quartz sand of the same type was also reacted with sodium hydroxide solution to soda waterglass under the same hydrothermal reaction conditions, which were as follows:

| | |
|---|---|
| Reaction temperature | 215° C.; |
| Reaction time | 30 mins; |
| Sodium hydroxide concentration | 20% by weight; |
| Amount of silica source used | 49.00 grams |
| Amount of 50 wt % NaOH used | 35.82 grams |
| Amount of additional water used | 53.72 grams |
| Excess of silicon dioxide | 5% (over the molar ratio of 3.46:1) |

The hydrothermal reactions led to the conversions and molar ratios shown in Table 3.

The results in Table 3 show that a quartz heat-treated at temperatures above 1100° C., more especially a quartz heat-treated at temperatures of 1300° C. and higher, surprisingly leads to a higher conversion of the $SiO_2$ content and to a higher molar ratio of silicon dioxide to sodium oxide in the sodium silicate solution than the sand treated at a lower temperature.

TABLE 3
EFFECT OF SAND PRETREATMENT CONDITIONS ON PRODUCT

| | % Conversion[2] | Solution Content[1] | | $SiO_2:Na_2O$ Ratios[1] | |
|---|---|---|---|---|---|
| | | % $SiO_2$ | % $Na_2O$ | Weight | Molar |
| Theoretical Values[3] | 100 | 35.19 | 10.00 | 3.52:1 | 3.63:1 |
| Sand with no heat treat[4] | 58.73 | 24.20 | 11.71 | 2.07:1 | 2.13:1 |
| 850° C. sand[4] | 48.11 | 20.74 | 12.25 | 1.69:1 | 1.75:1 |
| 850° C. sand*[4] | 49.18 | 21.10 | 12.20 | 1.73:1 | 1.78:1 |
| 950° C. sand[4] | 42.60 | 18.81 | 12.55 | 1.50:1 | 1.55:1 |
| 950° C. sand*[4] | 48.00 | 20.70 | 12.26 | 1.69:1 | 1.74:1 |
| 1100° C. sand*[4] | 57.50 | 23.82 | 11.77 | 2.02:1 | 2.09:1 |
| 1300° C. sand* | 86.81 | 32.05 | 10.49 | 3.05:1 | 3.15:1 |
| 1600° C. sand* | 90.30 | 32.91 | 10.36 | 3.18:1 | 3.28:1 |
| Cristobalite | 93.92 | 33.78 | 10.22 | 3.30:1 | 3.41:1 |

*Indicates treatment with addition of catalytic quantities of alkali.
[1]In the liquid phase after hydrothermal reaction.
[2]Defined as 100 - (% of silica source remaining solid after hydrothermal reaction).
[3]If the conversion were 100%.
[4]Comparative experiment, not according to the invention.

EXAMPLE 8

The effect of the faster reaction of quartz heat-treated at high temperatures, or of cristobalite, by comparison with an unconditioned quartz is demonstrated in the sole drawing Figure. This shows in graphical form the results of the reaction of cristobalite, together with 20% by weight aqueous sodium hydroxide solution, in amounts to produce a 5% excess of silicon dioxide over the molar ratio of 3.46:1 for $SiO_2:Na_2O$, in a pressure vessel at 215° C. times of 15, 30, 60, and 120 minutes. The molar ratio of silicon dioxide to sodium oxide in the liquid phase after reaction for the specified time was determined in each case. This curve is denoted by the reference numeral 1.

For comparison, a thermally untreated quartz sand was reacted under the same reaction conditions as described above and samples were again taken after the reaction times described above to determine the molar ratio. This curve is denoted by the reference numeral 2.

It can be calculated from the data shown in the Figure that, in the production process according to the invention where cristobalite is used, a conversion of more than 80% is obtained after only 15 minutes, with the conversion being substantially quantitative after a reaction time of only 30 minutes. By contrast, the comparison curve denoted by the reference numeral 2 shows a conversion of about 40 to 50% after 15 minutes and a maximum conversion of only 70%, even after a reaction time of 120 minutes; furthermore, in accordance with the literature data, it is possible to obtain a maximum molar ratio of $SiO_2$ to $Na_2O$ of no more than 2.8:1 even after several hours.

This aptly illustrates the advantages of the process according to the invention.

Group II: Examples with Significant Dissolved Silicate in the Liquid Phase at the Beginning of the Final Hydrothermal Reaction The same type of commercially available synthetic cristobalite as used for Examples 1–6 above was used as the silica source in the final hydrothermal reaction stage in all these Examples.

A horizontally arranged, nickel-clad cylindrical steel pressure vessel with a volume when empty of approximately 0.5 liter was used as reactor for carrying out the tests. The pressure vessel rotated about a horizontal shaft at a speed of approximately 60 r.p.m. It was heated from outside by a heat transfer medium healed to the reaction temperature.

Sodium silicate solutions having an $SiO_2:Na_2O$ molar ratio of 2.0:1 and 2.5:1 were prepared from sand and sodium hydroxide, introduced into the pressure reactor with addition of cristobalite and reacted for 20 to 60 minutes at 215° or 225° C. to form sodium silicate solutions having an $SiO_2:Na_2O$ molar ratio of 3.33 to 3.50:1.

Relevant particulars can be found in Examples 9 to 15. Example 9, which is not a complete process according to the invention, describes the production of a sodium silicate solution having a molar ratio of $SiO_2:Na_2O$ of $<2.0:1$, while Examples 10 to 15 relate to the reaction with cristobalite of such an intermediate sodium silicate solution, i.e. one having a molar ratio of $SiO_2:Na_2O$ of $<2.9:1$.

In one particularly economic embodiment, the process for producing the intermediate sodium silicate solution with a molar ratio of $<2.9:1$ may be directly combined with the subsequent reaction of this intermediate sodium silicate solution with added cristobalite to produce the desired sodium silicate solution with an $SiO_2:Na_2O$ molar ratio of 2.9 to 3.6:1 as the end product. This process sequence is described below.

The quantities of sand or cristobalite and caustic soda are determined by weighing machines. The starting materials sand and caustic soda are introduced into the reactor which is then closed and set rotating. The reaction mixture is heated to a reaction temperature of approximately 215° C. and is kept at that temperature. After a reaction time of 30 min at that temperature, the reactor was brought to a stop.

From a cristobalite-filled pressure vessel flanged onto the reactor, which is brought to the same pressure as the reaction vessel, the necessary quantity of cristobalite is introduced into the reactor which contains the previously formed sodium silicate solution with a molar ratio of $SiO_2:Na_2O$ of approximately 2.5:1. The pressurized storage vessel is then closed again, vented and separated from reactor. The quantity of cristobalite added corresponds to the additional amount of $SiO_2$ required to establish a molar ratio of $SiO_2:Na_2O$ of 3.46:1 in the sodium silicate solution desired as end product. The reactor is then left at the reaction temperature for another 20 to 60 minutes. The soda waterglass solution may then be further processed either in a sedimentation vessel for the coarse separation of solids or, where the clarity of the solution has to satisfy more stringent requirements, in a filter apparatus.

Alternatively, however, it is possible to transfer the pressurized liquid phase of the sodium silicate solution to a second optionally preheated reaction vessel, into which the calculated quantity of cristobalite has been introduced, and to complete the reaction therein.

In one particular embodiment, the hydrothermal process may even take place at relatively high solids concentrations in the reactor because the sodium silicate solution in the reactor has a sufficient viscosity range for the process under the reaction conditions, for example 215° C. at 20 bars pressure. On completion of the reaction, water may be additionally introduced either under pressure directly into the reactor or into the exhaust line to a receiving vessel during the transfer process, as described earlier in the Examples of Group I.

EXAMPLE 9

This Example relates to the production of an intermediate sodium silicate solution which was used as starting material for the subsequent reaction with cristobalite.

Amounts of 47 grams ("g") of sand and 100 g of a 30% by weight sodium hydroxide solution were introduced into a horizontally arranged cylindrical pressure vessel which was then closed so that it was pressure-tight. After a reaction time of 30 minutes at 215° C. and 20 bars pressure, the reactor was cooled and the sodium silicate solution formed was analyzed. It had an $SiO_2$:$Na_2O$ molar ratio of 2.0:1.

This sodium silicate solution was further reacted with cristobalite as described in Example 10. The sodium silicate solutions used as starting materials for the subsequent reactions in Examples 11 to 15 were obtained in the same general manner as in Example 9, but with suitable modified starting material ratios and extended reaction times (90 min) to yield an $SiO_2$:$Na_2O$ ratio of 2.5:1.

EXAMPLE 10

Starting from a sodium silicate solution having an $SiO_2$:$Na_2O$ molar ratio of 2.0:1, a sodium silicate solution with an $SiO_2$:$Na_2O$ molar ratio of 3.37:1 was obtained with addition of cristobalite over a reaction time of 30 minutes at 215° C.

EXAMPLES 11, 12, and 13

In Examples 11, 12 and 13, sodium silicate solutions with an increasing molar ratio of $SiO_2$:$Na_2O$ of 3.33 to 3.43:1 were obtained from a sodium silicate solution having a molar ratio of $SiO_2$ to $Na_2O$ of 2.5:1 over reaction times of 20 minutes at 215° C., with different amounts of cristobalite. The cristobalite excess, based on a desired ratio of $SiO_2$:$Na_2O$ of 3.46:1 in the end product, was 0% for Example 11, 3% for Example 12, and 5% for Example 13.

EXAMPLES 14 and 15

Starting from a sodium silicate solution having an $SiO_2$:$Na_2O$ molar ratio of 2.5:1, sodium silicate solutions with a molar ratio of 3.46 to 3.50:1 I were prepared, with addition of cristobalite, using reaction times of 60 minutes at different reaction temperatures (215° and 225° C.).

Details of the amounts of starting materials used, reaction condition, and product characteristics for Examples 10 to 15 are shown in Table 4. Examples 11, 12, and, in particular, 13 show that the reaction of sodium silicate solutions having a molar ratio of $SiO_2$:$Na_2O$ of <2.9:1 with the crystalline $SiO_2$ component, cristobalite, leads to sodium silicate solutions having molar ratios of $SiO_2$:$Na_2O$ from 3.33 to 3.43:1, even with short reaction times (<30 mins.) and relatively low reaction temperatures.

TABLE 4

DETAILS FOR EXAMPLES 10–15

| | Properties of the Sodium Silicate Solution at the Beginning of the Final Hydrothermal Reaction According to the Invention | | | | Other Materials and Conditions Used in the Final Hydrothermal Reaction According to the Invention | | | Properties of the Sodium Silicate Solution Formed by the Final Hydrothermal Reaction According to the Invention | | |
|---|---|---|---|---|---|---|---|---|---|---|
| | | Amount | Content of: | | | | | Oxide Contents | | |
| Example Number | Molar Ratio, $SiO_2$:$Na_2O$ | of Solution Used, g | $SiO_2$, grams | $Na_2O$, grams | Cristobalite grams | Temperature, °C. | Time, min | $SiO_2$ % | $Na_2O$ % | Molar ratio, $SiO_2$:$Na_2O$ |
| 10 | 2.0:1 | 122.32 | 28.3 | 14.57 | 20.70 | 215 | 30 | 33.6 | 10.3 | 3.37:1 |
| 11 | 2.5:1 | 129.42 | 35.4 | 14.57 | 13.60 | 215 | 20 | 33.2 | 10.3 | 3.33:1 |
| 12 | 2.5:1 | 129.42 | 35.4 | 14.57 | 15.10 | 215 | 20 | 33.7 | 10.3 | 3.38:1 |
| 13 | 2.5:1 | 129.42 | 35.4 | 14.57 | 16.05 | 215 | 20 | 33.8 | 10.2 | 3.43:1 |
| 14 | 2.5:1 | 129.42 | 35.4 | 14.57 | 16.05 | 215 | 60 | 34.2 | 10.2 | 3.46:1 |
| 15 | 2.5:1 | 129.42 | 35.4 | 14.57 | 16.05 | 225 | 60 | 34.5 | 10.2 | 3.50:1 |

What is claimed is:

1. A process for production of an aqueous sodium silicate solution having a selected $SiO_2$:$Na_2O$ molar ratio, said selected $SiO_2$:$Na_2O$ molar ratio being at least 2.9:1, said process comprising the steps of:
   (A) providing a solid silica source selected from the group consisting of
      (1) silica sources that contain more than 50 volume % cristobalite and
      (2) silica sources produced by heating, at a temperature of at least 1100° C. but below the melting point of silica for a time of at least 10 minutes, a precursor solid silica source that initially contains at least 50% by volume of crystalline silica; and
   (B) hydrothermally reacting the solid silica source provided in step (A), in a closed pressure reactor at a temperature between about 150 and about 300. C and under a saturated steam pressure corresponding to the temperature used, with a solution which at the beginning of reaction consists essentially of
      (1) water,
      (2) dissolved sodium oxide, and, optionally
      (3) dissolved silicate in an amount such that the molar ratio of $SiO_2$:$Na_2O$ in the solution is less than said selected molar ratio.

2. A process as claimed in claim 1, wherein the selected $SiO_2$:$Na_2O$ molar ratio is not more than about 3.7:1.

3. A process as claimed in claim 2, wherein the selected $SiO_2$:$Na_2O$ molar ratio in the range from about 3.0 to about 3.6:1.

4. A process as claimed in claim 3, wherein the selected $SiO_2$:$Na_2O$ molar ratio is in the range from about 3.3 to about 3.5:1.

5. A process as claimed in claim 1, wherein the amounts of the solid silica source and of aqueous solution hydrothermally reacted in step (B) are such that the molar ratio of the sum of the number of moles of $SiO_2$ in the solid silica source and of the number of moles of any dissolved $SiO_2$ in the aqueous solution to the number of moles of dissolved $Na_2O$ in the aqueous solution is equal to the selected $SiO_2$:$Na_2O$ molar ratio.

6. A process as claimed in claim 1, wherein the amounts of solid silica source and of aqueous solution hydrothermally reacted in step (B) are such that the molar ratio of the sum of the number of moles of SiO$_2$ in the solid silica source and of the number of moles of any dissolved SiO$_2$ in the aqueous solution to the number of moles of dissolved Na$_2$O in the aqueous solution exceeds the selected SiO$_2$:Na$_2$O molar ratio by an amount within the range from about 1 to about 10% of the selected SiO$_2$:Na$_2$O molar ratio.

7. A process as claimed in claim 1, wherein the aqueous solution used in step (B) initially contains dissolved sodium oxide in an amount stoichiometrically equivalent to from about 10 to about 50% by weight of sodium hydroxide and no dissolved silicate.

8. A process as claimed in claim 7, wherein the aqueous solution used in step (B) initially contains dissolved sodium oxide in an amount stoichiometrically equivalent to from about 15 to about 30% by weight of sodium hydroxide and no dissolved silicate, and the temperature during step (B) is in the range from about 200° to about 250° C.

9. A process as claimed in claim 8, wherein the aqueous solution used in step (B) initially contains dissolved sodium oxide in an amount stoichiometrically equivalent to from about 20 to about 30% by weight of sodium hydroxide and no dissolved silicate.

10. A process as claimed in claim 9, wherein the silica source step (A) is of type (2), the precursor solid silica source is natural quartz sand, the temperature of heating the precursor solid silica source before provision in step (A) is in the range from about 1200° to about 1700° C., and the heating before provision in step (A) is performed while the precursor solid silica source is in contact with catalytically effective amounts of alkali for the conversion of quartz to cristobalite.

11. A process as claimed in claim 8, wherein the silica source provided by step (A) is of type (2), the precursor solid silica source is natural quartz sand, the temperature of heating the precursor solid silica source before provision in step (A) is in the range from about 1200° to about 1700° C., and the heating before provision in step (A) is performed while the precursor solid silica source is in contact with catalytically effective amounts of alkali for the conversion of quartz to cristobalite.

12. A process as claimed in claim 7, wherein the silica source provided by step (A) is of type (2), the precursor solid silica source is natural quartz sand, the temperature of heating the precursor solid silica source before provision in step (A) is in the range from about 1200° to about 1700° C., and the heating before provision in step (A) is performed while the precursor solid silica source is in contact with catalytically effective amounts of alkali for the conversion of quartz to cristobalite.

13. A process as claimed in claim 12, wherein the temperature of heating before provision in step (A) is in the range from about 1300° C. to about 1600° C.

14. A process as claimed in claim 1, wherein the aqueous solution used in step (B) is prepared by hydrothermal reaction of an initially substantially silica-free aqueous solution of sodium hydroxide with natural quartz sand in a pressure vessel at a temperature within the range from about 150° to about 300° C. under a saturated steam pressure corresponding to the temperature.

15. A process as claimed in claim 14, wherein said initially substantially silica-free aqueous solution of sodium hydroxide contains from about 10 to about 50% by weight of sodium hydroxide.

16. A process as claimed in claim 15, wherein said initially substantially silica-free aqueous solution of sodium hydroxide contains from about 15 to about 30% by weight of sodium hydroxide.

17. A process as claimed in claim 16, wherein the temperature during step (B) and during the hydrothermal reaction between the initially substantially silica-free aqueous solution of sodium hydroxide and the quartz sand is in the range from about 200° to about 250° C.

18. A process as claimed in claim 15, wherein the temperature during step (B) and during the hydrothermal reaction between the initially substantially silica-free aqueous solution of sodium hydroxide and the quartz sand is in the range from about 200° to about 250° C.

19. A process as claimed in claim 18, wherein the silica source provided by step (A) is of type (2), the precursor solid silica source is natural quartz sand, the temperature of heating the precursor solid silica source before provision in step (A) is in the range from about 1200° to about 1700° C., and the heating before provision in step (A) is performed while the precursor solid silica source is in contact with catalytically effective amounts of alkali for the conversion of quartz to cristobalite.

20. A process as claimed in claim 17, wherein the silica source provided by step (A) is of type (2), the precursor solid silica source is natural quartz sand, the temperature of heating the precursor solid silica source before provision in step (A) is in the range from about 1200° to about 1700° C., and the heating before provision in step (A) is performed while the precursor solid silica source is in contact with catalytically effective amounts of alkali for the conversion of quartz to cristobalite.

21. A process as claimed in claim 16, wherein the silica source provided by step (A) is of type (2), the precursor solid silica source is natural quartz sand, the temperature of heating the precursor solid silica source before provision in step (A) is in the range from about 1200° to about 1700° C., and the heating before provision in step (A) is performed while the precursor solid silica source is in contact with catalytically effective amounts of alkali for the conversion of quartz to cristobalite.

22. A process as claimed in claim 15, wherein the silica source provided by step (A) is of type (2), the precursor solid silica source is natural quartz sand, the temperature of heating the precursor solid silica source before provision in step (A) is in the range from about 1200° to about 1700° C., and the heating before provision in step (A) is performed while the precursor solid silica source is in contact/with catalytically effective amounts of alkali for the conversion of quartz to cristobalite.

23. A process as claimed in claim 22, wherein the temperature of heating before provision in step (A) is in the range from about 1300° C. to about 1600° C.

24. A process as claimed in claim 14, wherein the aqueous solution used in step (B) is prepared by hydrothermal reaction in the same pressure vessel and at the same temperature and pressure as are used for step (B) itself, the silica source provided by step (A) being separately brought to the same temperature and pressure as used for step (B) before being added to the pressure reactor containing the aqueous solution to be used for step (B).

* * * * *